United States Patent
Quigley

(10) Patent No.: US 11,209,168 B2
(45) Date of Patent: Dec. 28, 2021

(54) KSV 4 IN 1 FIRE PIT

(71) Applicant: David Emerson Quigley, Milford, NH (US)

(72) Inventor: David Emerson Quigley, Milford, NH (US)

(*) Notice: Subject to any disclaimer, the term of this patent is extended or adjusted under 35 U.S.C. 154(b) by 0 days.

(21) Appl. No.: 16/122,389

(22) Filed: Sep. 5, 2018

(65) Prior Publication Data

US 2019/0101292 A1    Apr. 4, 2019

Related U.S. Application Data

(63) Continuation of application No. 15/204,942, filed on Jul. 7, 2016, now Pat. No. 10,094,574.

(60) Provisional application No. 62/390,357, filed on Mar. 28, 2016.

(51) Int. Cl.
  *F24B 3/00*    (2006.01)
  *A47J 37/00*    (2006.01)
  *A47J 37/07*    (2006.01)

(52) U.S. Cl.
  CPC .............. *F24B 3/00* (2013.01); *A47J 37/00* (2013.01); *A47J 37/07* (2013.01)

(58) Field of Classification Search
  CPC .............. F24B 3/00; F24B 1/00; A47J 37/07
  USPC ........................................................ 126/145
  See application file for complete search history.

(56) References Cited

U.S. PATENT DOCUMENTS

| | | | |
|---|---|---|---|
| 2,728,334 A | 12/1955 | Paolella | |
| 3,491,744 A | 1/1970 | von Kohorn et al. | |
| 3,745,303 A | 7/1973 | Epperson et al. | |
| D233,499 S | 11/1974 | Sakata | |
| 4,849,128 A * | 7/1989 | Timmons | C02F 1/54 252/181 |
| 5,183,027 A * | 2/1993 | Saldana | A47J 37/0704 108/50.13 |
| 5,655,435 A * | 8/1997 | Rachesky | A47J 37/0704 126/25 R |

(Continued)

OTHER PUBLICATIONS

Notice of Allowance dated Jul. 17, 2018 for U.S. Appl. No. 15/204,942, 9 pages.

(Continued)

*Primary Examiner* — David J Laux
*Assistant Examiner* — Nikhil P Mashruwala
(74) *Attorney, Agent, or Firm* — Cooley LLP

(57) ABSTRACT

The KSV 4in1 Fire Pit can be used in four different ways. It comes standard as a portable fire pit. However, you can also add to the KSV Fire Pit a powder coated steel pan accessory which during the day turns makes it an ice chest and cooler. It's perfect for keeping your wine, beer, soda, water, hors d'oeuvres, etc. . . . cold throughout the day. When it's time to start a fire, the user removes the cooler safety sleeve and slides out the cooler pan, and then slides in the heavier gauge stainless steel fire pan followed by the stainless steel safety sleeve. When you've created enough hot coals in the pan, the user can add the KSV soap stone accessory for sauteing their favorite meat, fish or vegetables or insert the stainless steel grill that fits directly inside and on top of the stainless safety sleeve. Once the coals cool, the user can cover the fire pan with the coffee table top that turns the KSV Pit into a handsome coffee table for breakfast and morning coffee. That's 4 uses in 1 beautiful accessory to an outdoor living patio.

24 Claims, 6 Drawing Sheets

(56) References Cited

U.S. PATENT DOCUMENTS

| | | |
|---|---|---|
| 5,699,784 A | 12/1997 | Tippmann et al. |
| 5,868,128 A | 2/1999 | Omar |
| 6,032,590 A | 3/2000 | Chen |
| 6,065,466 A * | 5/2000 | Baykal ................ A47J 37/0781 |
| | | 126/41 R |
| D449,490 S | 10/2001 | Frederick |
| 6,314,955 B1 | 11/2001 | Boetcker |
| D590,201 S | 4/2009 | Zagar |
| D596,892 S | 7/2009 | Vanderminden |
| D602,148 S | 10/2009 | DeFouw et al. |
| D603,037 S | 10/2009 | DeFouw et al. |
| D624,781 S | 10/2010 | Allen et al. |
| D679,791 S | 4/2013 | Lowsky |
| D690,405 S | 9/2013 | Lowsky |
| D698,908 S | 2/2014 | Krieger |
| 8,931,218 B2 | 1/2015 | Raboine |
| D729,914 S | 5/2015 | Kinchen et al. |
| D729,915 S | 5/2015 | Zhang |
| 9,074,775 B2 | 7/2015 | McCary, Sr. |
| 9,138,099 B2 | 9/2015 | Dhuper et al. |
| 9,155,416 B1 | 10/2015 | Kuhl |
| D742,490 S | 11/2015 | Jepson |
| D757,238 S | 5/2016 | Horsfield |
| D765,231 S | 8/2016 | Horsfield |
| 9,474,414 B2 * | 10/2016 | Yuen ................ A47J 37/0713 |
| 9,474,415 B2 | 10/2016 | Banal et al. |
| D774,172 S | 12/2016 | Zemel et al. |
| 10,094,574 B2 | 10/2018 | Quigley |
| 11,015,818 B1 * | 5/2021 | Ritchie ................ A47J 37/0704 |
| 2005/0109331 A1 * | 5/2005 | Chao ................ A47J 37/0781 |
| | | 126/25 R |
| 2008/0264408 A1 | 10/2008 | Konkle et al. |
| 2010/0101558 A1 | 4/2010 | Murrin et al. |
| 2013/0081609 A1 * | 4/2013 | Dhuper ................ A47J 37/0781 |
| | | 126/25 AA |
| 2013/0255659 A1 | 10/2013 | Fulp et al. |
| 2013/0269674 A1 * | 10/2013 | Junge, Sr. ................ A47J 37/07 |
| | | 126/30 |
| 2014/0174427 A1 | 6/2014 | Yuen |
| 2014/0331986 A1 | 11/2014 | McCary, Sr. |
| 2015/0013664 A1 * | 1/2015 | Riel ................ A47J 37/0781 |
| | | 126/506 |
| 2015/0075514 A1 | 3/2015 | Kuenzinger |
| 2015/0308692 A1 * | 10/2015 | Hurt ................ F24B 1/195 |
| | | 126/65 |
| 2016/0166109 A1 | 6/2016 | Banal et al. |
| 2016/0290653 A1 | 10/2016 | Roy et al. |
| 2017/0013999 A1 | 1/2017 | Horsfield |

OTHER PUBLICATIONS

Non-Final Office Action dated Jan. 9, 2020 for U.S. Appl. No. 29/679,712, 6 pages.

* cited by examiner

KEY
⬛⬛⬛⬛⬛ Weld seam

KEY

┈┈┈┈ Weld seam

KSV 4 IN 1 FIRE PIT

CROSS-REFERENCE TO RELATED APPLICATIONS

This application is a continuation of U.S. patent application Ser. No. 15/204,942, entitled "KSV 4 in 1 Fire Pit," filed Jul. 7, 2016, which claims priority to and the benefit of U.S. Provisional Patent Application No. 62/390,357, entitled "King Street Vineyards (KSV) Portable Granite Fire Pit," filed Mar. 28, 2016, the disclosures of which are hereby incorporated by reference in their entirety.

BACKGROUND OF INVENTION

The present invention is in the fields of Outdoor Patio Accessories and Outdoor Patio Furniture. More particularly, the present invention is in the field of outdoor portable fire pits.

Existing and conventional fire pits serve the user primarily as an outdoor accessory that allows for the user to safely contain a fire type (i.e., gas, wood, or briquette) inside a containment outdoor element, i.e., a fire pit, for outdoor entertainment purposes. Based on the design of the conventional fire pit it may allow users to use it secondarily as a flat surface or coffee table, however, the fire containment function both physically and functionally is always present. In addition, there are built-in fire pits which are not portable and there are portable fire pits. Portable fire pits are typically immovable as in a built-in patio stonework system or at the very least difficult to transport because they are often fairly large and heavy. Moving such devices typically requires several strong persons, or a sturdy wheeled vehicle such as a handcart or wagon. Furthermore, for the few fire pits that can be moved in this fashion they are rarely moved once in a specific location outdoors due to the difficulties of moving the outdoor element.

SUMMARY OF INVENTION

The present invention is an easily movable and portable KSV 4in1 Fire Pit that can be swapped out with three equally capable outdoor patio functions, beyond its fire containment outdoor element function, that includes an ice chest/cooler, two separate grilling surfaces, and a multi-tier full patio coffee table making it a 4in1 Outdoor Patio Accessory with the process of swapping one function for another enabled through its unique, one of a kind, hidden from view, railing system.

DETAILED DESCRIPTION OF THE DRAWING

Figure 1:
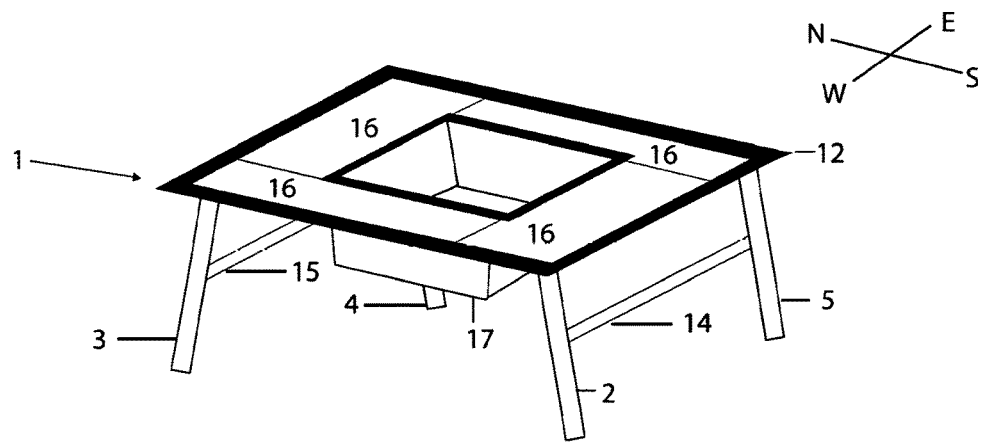
FIG. 1 is a perspective view of the present invention.

Referring now in more detail, FIG. 1 is a perspective view of the invention which includes the frame tray 12, four granite inlays 16, held in place by a 30".times.30" frame tray system 12 made of black powder coated 1" angle iron, the frame's four upright legs 2, 3, 4, 5 made of black powder coated 1" angle iron, front 14 and back 15 stabilizing braces 1.5" flat bar black powder coated welded to the frame, and the fire pit stainless steel pan or its identically dimensioned ice cooler stainless steel pan 17 depending upon the users primary outdoor patio entertainment plan for that moment.

Additionally, in reference to the two stainless steel pans 17, one is used to contain the fire and the other to contain ice. The invention currently uses a light weight 18 gauge stainless steel for the cooler pan and a heavier 10 gauge stainless steel for the construction of the fire pit pan 17. Similar gauge stainless steel is used in the manufacturing of the corresponding safety sleeve 32 in FIG. 8 used in support of both functions. It is the intention of this present invention to utilize other materials such as plastic or a ceramic for the cooler pan keeping it within the design and construct of easily sliding the cooler pan on the railing system described in further detail below.

As mentioned, the invention has four legs, 2, 3, 4, 5, all 18" in length but the length may change as we receive more suitable user requirements upon greater use in the field.

Figure 2:
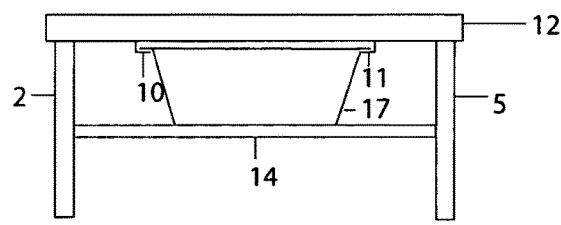
FIG. 2 is a south side view of the present invention.
Figure 3:
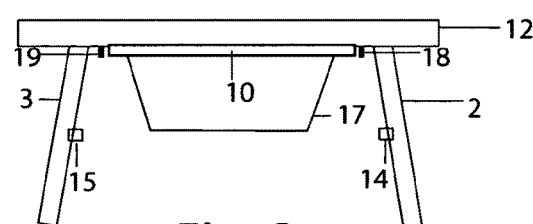
FIG. 3 is a west side view of the present invention.

The legs have two different visual and physical layouts that can be seen easily in legs 2, 5 in FIG. 2 and the difference highlighted in legs 3, 2 in FIG. 3.

Figure 6:
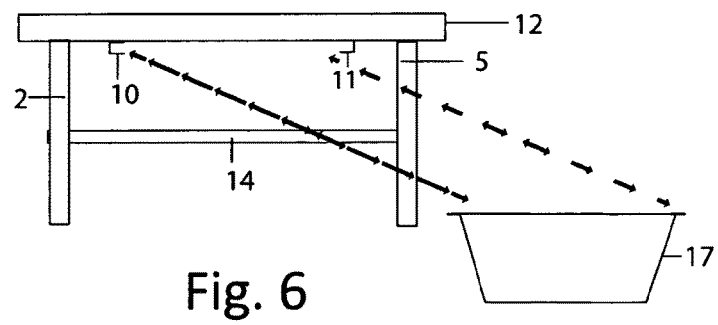
FIG. 6 is a south side view of the present invention detailing where the invention's functions are swapped in and out.

From the western side view, FIG. 3 it is easy to see that the legs are set at 7 degrees emerging outward from the bottom side base of the frame tray 12 while on the southern frontview FIG. 2, where the user physically swaps the multiple functional elements in and out of the tray frame 12 using the railing system 10, 11 detailed in FIG. 6, the legs set at a 90 degree right angle from the bottom side base of the frame tray 12 to where it rests on the ground.

The primary reason for the approach is for stability and product longevity (i.e., strength). With the legs bulk as seen in FIG. 1 at a right angle and supporting a 30".times.30" exterior frame tray 12 and an interior 18" frame base FIG. 6A, the frame is significantly stronger and safer against structural damage either from years of use or from an accident when significant weight is quickly applied to the top of the frame tray 12. In addition, the invention has added front stabilizing brace 14 that can be seen in FIG. 1, FIG. 2, FIG. 3, FIG. 6 and back stabilizing brace 15 that can be seen in FIG. 1, FIG. 3. Secondarily, from an appearance perspective it is the inventor's design belief that the 7 degree angle of the four legs 2, 3, 4, 5 viewed from the front or back views provides a more attractive appearance as a valued home outdoor patio accessory.

Figure 4:
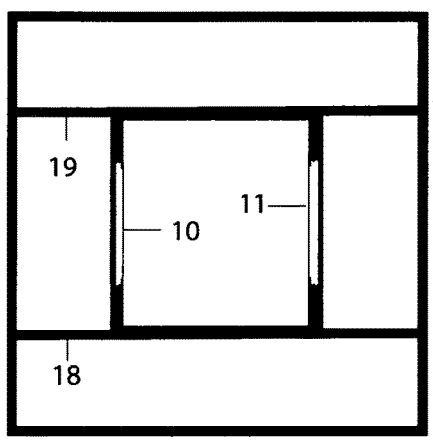
FIG. 4 is a top view of the present invention with no granite inlays and exposing the top view of the frame.
Figure 5:
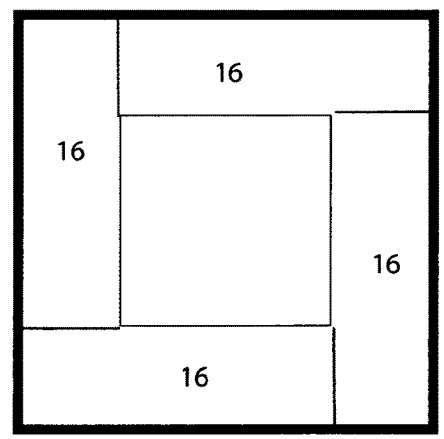
FIG. 5 is a top view of the present invention with granite inlays covering a portion of the underside frame.

FIG. 4 and FIG. 5 detail two top views of the frame tray 12. FIG. 5 consists of the frame tray 12 and includes the four 23 3/16.times.16 1/2.times.1 1/4 identical granite inlays 16, while FIG. 4 does not include the 4 granite inlays 16, and exposes the complete top view of the frame tray 12, the back center 19 and front center 18 tray bars, and the railing system left 10 and railing system right 11.

The frame tray 12 is currently manufactured around a design built around a square geometry, however, it is the intention of the inventor to use the concept of a self-contained geometric tray to hold and adhere in place its material inlays of a variety of geometric types, such as a circle, rectangle, polygon, etc. . . . The basis of the invention's tray system is that the elements, such as the existing 4 granite inlays 16, but could be consists of any other pertinent materials in the future such as ceramic, stone, glass, etc. that can operate within a high temperature environment and are kept in place and held inside the tray. The unique one of a kind invention is that the tray performs the requirement for holding and adhering a variety of material inlays in place, without the use of adhesives or other manner of connecting and holding inlays to a plane surface while the invention is being used.

The railing system represents the invention's primary unique, one of a kind core element as seen in FIG. 6. It is made up of two railing slats 10, 11 detailed in FIG. 6A which provide an easy and quick method for swapping one function such as a fire pit stainless steel plan 17 out for another function such as a coffee table top 45 or ice cooler pan 17. The individual railing system rail is made from welding a 1½ inch angle iron, 12, to a 1" angle iron, 13 as seen in FIG. 6B which are then welded to the frame through the front center tray bar 18, and the back center tray bar 19.

Figure 7:
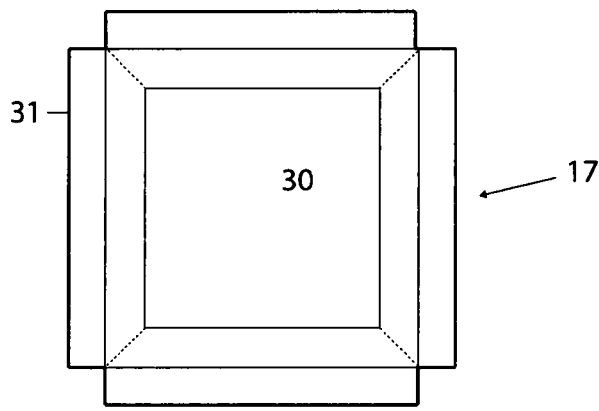
FIG. 7 is a top view of the fire pit pan and the ice cooler pan of the present invention.
Figure 7A:
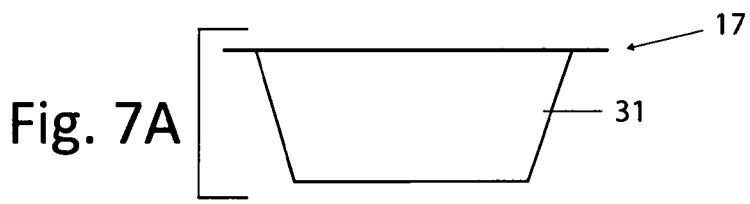
FIG. 7A is a side view of the fire pit pan and the ice cooler pan of the present invention.

It is important to point out the only difference current between the two functional pans FIG. 7 referenced together as 17 (i.e., fire pit pan and ice cooler pan) is the gauge of the stainless steel metal material used to manufacture the two noted above in the second paragraph of this Detailed Description of the Invention Section, are a light gauge for the ice cooler pan and a heavy gauge for the fire pit pan. The heavy gauge is required due to the extreme conditions of up to 1800 degrees Fahrenheit temperatures when using wood in the containment of a stainless steel pan. It is the intention of the inventor to manufacture future ice cooler pans using other materials such as plastic, ceramic or other.

The two functional pans 17 are made from two elements, four stainless steel side panels 31, and one stainless steel pan bottom, 30. The corner edges of the pan are notched in order to slip easily into the railing system detailed in FIG. 6A and FIG. 7B. FIG. 7C details using a dotted line the three sides that are welded to both its corresponding side panels 31, as well as the pan bottom, 30. The top section to the side panel is bent at a 90 degree angle.

The stainless steel safety sleeve 32 FIG. 8, FIG. 8A, FIG. 8B, FIG. 8C is used for three purposes. The first is to protect the edge of the granite inlays 16 from the extreme heat environment created in the stainless steel fire pit pan 17. The second purpose of the safety sleeve 32 is as a safety guard disabling the accidental removal of the fire pit pan 17 while it contains hot ambers, etc. The safety sleeve 32 must be removed first as detailed in 35 before the user can remove the fire pit pan 17 as detailed in FIG. 8C. 35 also references how the safety sleeve is put into position once either pan in place using the invention's railing system.

Figure 8:
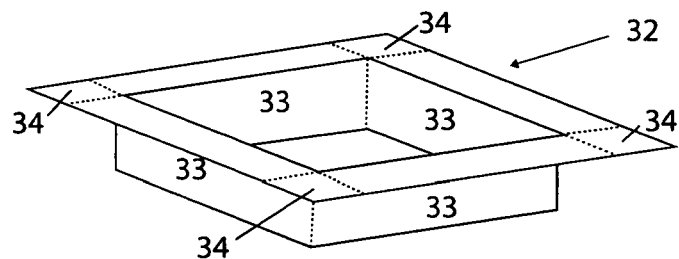
FIG. 8 is a perspective view of the safety sleeve element that is inserted on top of the granite inlays and slips down and inside the KSV 4in1 Fire Pit pan of FIG. 7 displaying the four equally dimensioned side flaps with 90 degree bends and the four equally dimensioned corner squares of the present invention.
Figure 8A:
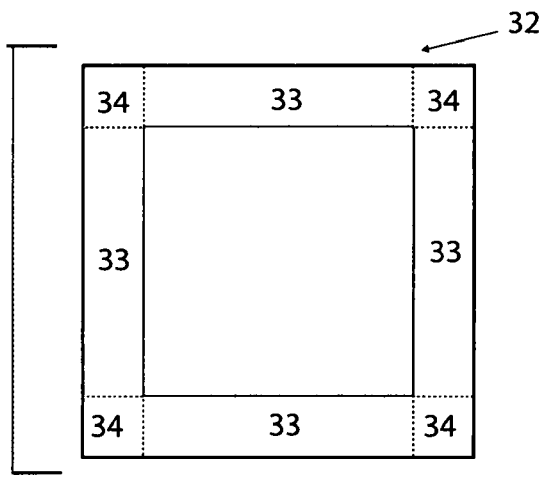
FIG. 8A is a top view of the safety sleeve element displaying the four equally dimensioned side flaps with 90 degree bends and the four equally dimensioned corner squares of the present invention.
Figure 8B:
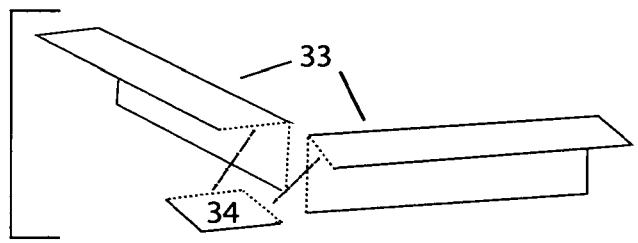
FIG. 8B is a perspective view of one of four equally dimensioned side flaps that welded together and welded to the four equally dimensioned corner squares make up FIG. 8 of the present invention.
Figure 8C:
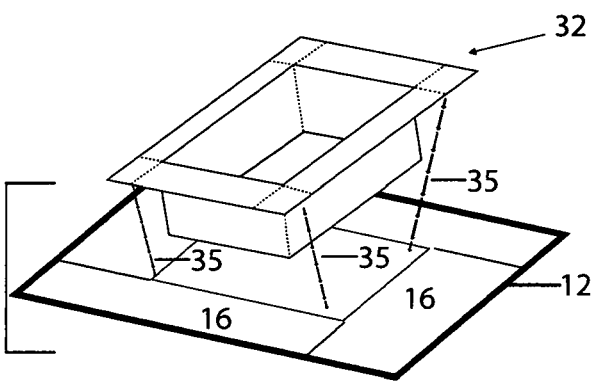
FIG. 8C is a perspective view of FIG. 8 being inserted on top of FIG. 5, the 4 granite inlays of the present invention.

The stainless steel safety sleeve 32 FIG. 8, FIG. 8A, FIG. 8B, FIG. 8C is made up of two elements; four identical stainless steel side flaps 33 as seen in FIG. 8, 8A, and 8B and four identical square corner flaps as detailed in FIG. 8, 8A, and 8B. FIG. 8A and FIG. 8B detail where the two elements are welded to form the safety sleeve 32.

Figure 9:
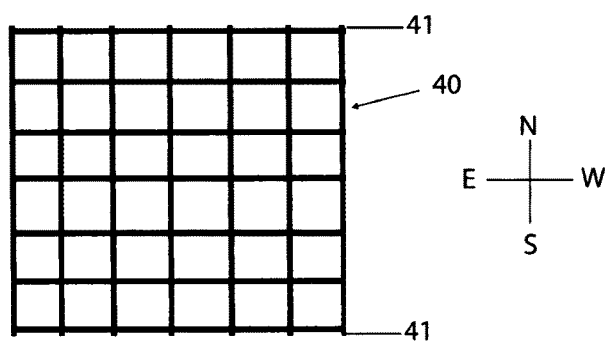
FIG. 9 is a top view of one of two grilling surfaces and one of four present invention's functions.
Figure 9A:
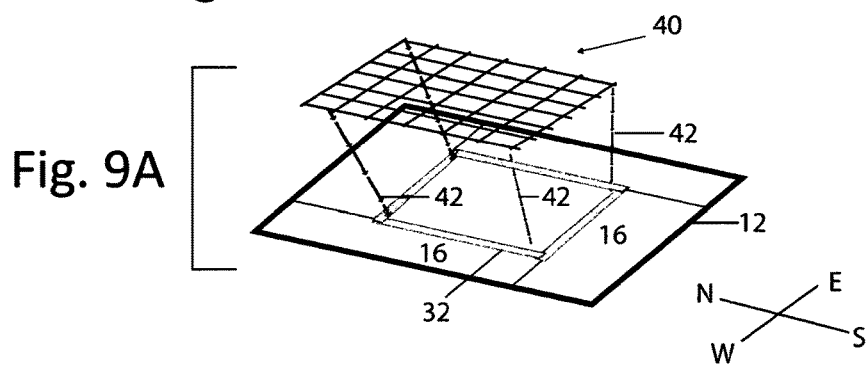
FIG. 9A is a perspective view of FIG. 9 slipping inside FIG. 8; the safety sleeve of the present invention.

FIG. 9 details one of two grilling elements of the present invention, the stainless steel grill 40 (dimensions: 17 3/4.times.15 3/4) made from heavy gauge stainless steel rod and manually spot welded. FIG. 9A highlights how the grill 40 is placed inside and fits snugly inside the safety sleeve as a result of designing the grill 40 by extending the rods running north-south, beyond their intersecting stainless steel rod running east-west by ½" referenced as 41 allowing for the inside non-extended stainless steel rod to sit inside the safety sleeve 32 (which lies on top of the four granite inlays 16) while being held in place on top of the safety sleeve via the ½" extended rods 41 seen in FIG. 9.

Figure 10:
FIG. 10 is a perspective view of the second of two grilling surfaces and one of four present invention's functions.
Figure 10A:
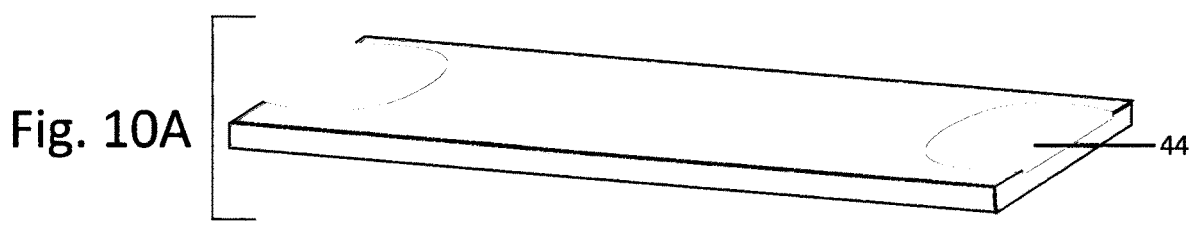
FIG. 10A is a perspective view of the second of two grilling surfaces and one of four present invention's functions.

FIG. 10 represents the other grilling element, a soapstone 43 (dimensions 22.times.7.times.1.25) includes two carved "half-moon" circles on the back side 44 as seen in FIG. 10A specifically carved into the stone to allow for easy handling and cleaning.

Figure 6A:
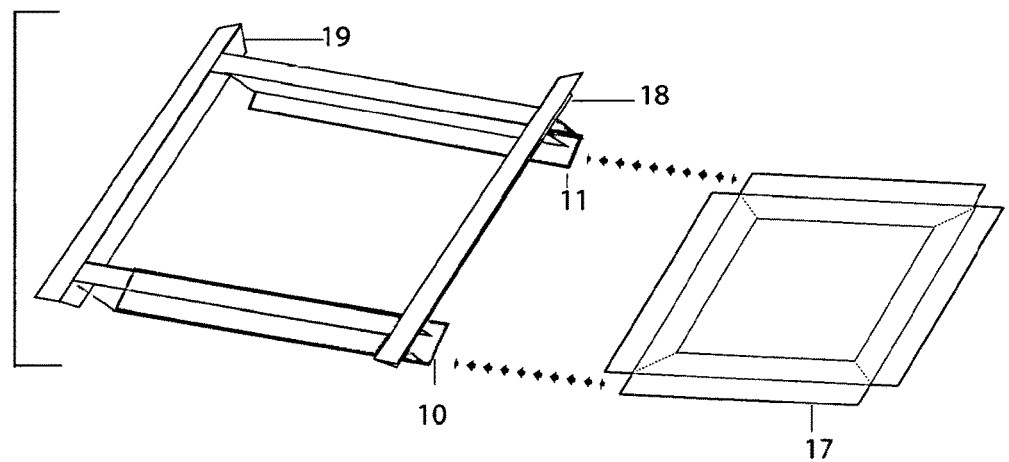
FIG. 6A is a closer view of FIG. 6 and where the invention's functions are swapped in and out.
Figure 6B:
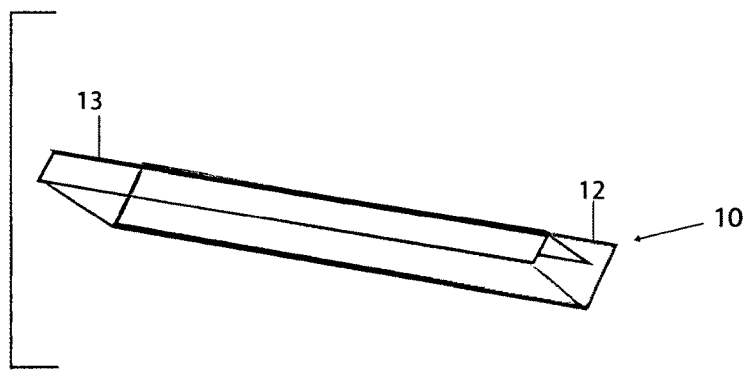
FIG. 6B is a close-up view of the left rail in FIG. 1 detailing the two angle iron members are welded to form one member and attach to the present invention's frame.
Figure 7B:
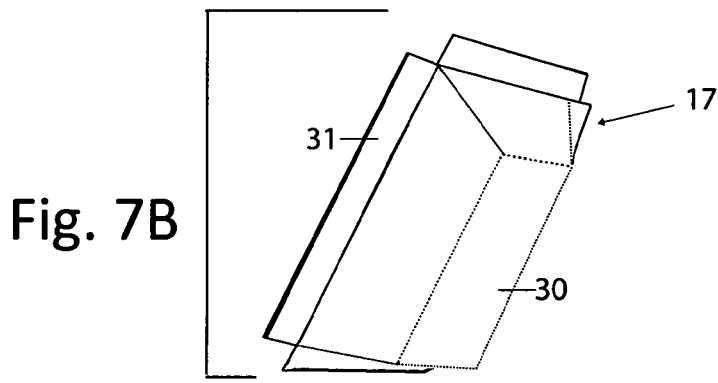
FIG. 7B is a perspective view of the two sides and bottom of the fire pit pan and the ice cooler pan of the present invention.
Figure 7C:
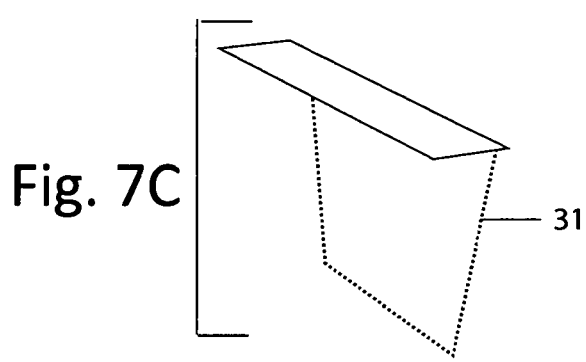
FIG. 7C is a perspective view of one of four equally dimensioned side panels that welded together and welded to the pan bottom make up FIG. 7 of the present invention.
Figure 11:
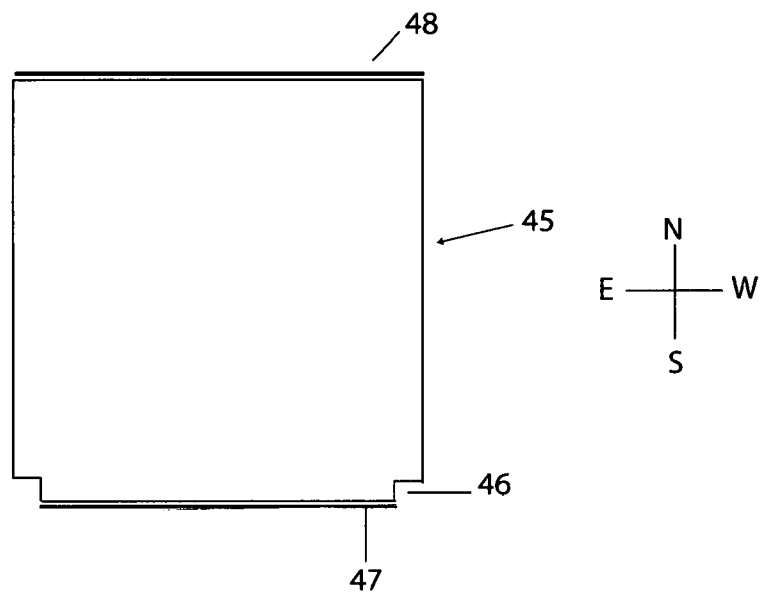
FIG. 11 is a top view of the multi-tier table top that when inserted into the railing system turns the present invention into a full outdoor patio coffee table.
Figure 12:
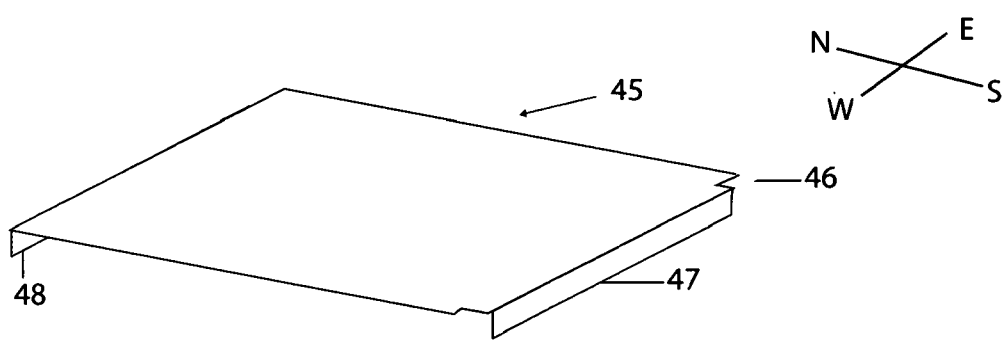
FIG. 12 is a perspective view of FIG. 11 detailing the two notches on either end of one of the four sides in addition to a bend used to secure the top in place.

FIG. 11 represents the unique, one of a kind coffee table top 45 (18 1/4.times.19 1/4") that once slid into the railing system 10, 11 of FIG. 6A turns the present invention into a fully functional 100% patio coffee table. FIGS. 11 and 11A presents top and perspective views highlighting the two table top notches 46 on the south end of the table top 45 reducing its length to 15 3/4" with its non-notched north side remaining at 18 1/4". The notched end permits the table top 45 to be properly inserted into and removed from the railing system. Both north 48 and south 47, ½" 90 degree turned ends are used to secure the table top 45 in place once the table top has been slid into full position.

The advantages of the present invention include, without limitation, its ability to easily change its primary function from one patio element function to another by sliding an existing functional element out of the invention on the interior framed railing system and then sliding in a new functional element in on the same railing system, significantly transforming and changing its function and purpose.

Additional advantages of the present invention include, without limitation, that as a result of the ability to insert and remove multiple major functional capabilities using its railing system, and the unique design of the inventions tray frame 12 and the four identical granite inlays or whatever other materials the invention utilizes and that can be easily removed and inserted back makes this portable outdoor patio accessory exceedingly easy to move and transport, wherein, even a single person can accomplish. Further the invention can be moved from spot to spot in an outdoor patio environment by one person while leaving the granite inlays 16 or other material inlays in place within the frame tray 12, by removing all accessories from the railing system and stepping inside the frame tray 12 finding a balance in the middle of the left and right sides of the invention and picking the invention up and moving it with ease to a new location on the property.

In broad embodiment, the present invention is a 4 in 1 fire pit that can be converted to three other major outdoor patio functions including but not limited to, ice cooler, grill, and coffee table.

While the foregoing written description of the invention enables one of ordinary skill to make and use what is considered presently to be the best more thereof, those of ordinary skill will understand and appreciate the existence of variations, combinations, and equivalents of the specific embodiment, method, and examples, herein. The invention should therefore not be limited by the above described embodiment, method and examples, but by all embodiments and methods within the scope and spirit of the invention as claimed.

The invention claimed is:

1. An apparatus, comprising:
    a support structure;
    a frame coupled to the support structure, the frame including an aperture disposed therein;
    a railing system suspended and extending from a bottom surface of the frame, the railing system configured to receive a removable receptacle, the removable receptacle configured to contain fuel for a fire and to be aligned within the aperture; and
    a sleeve disposed within the aperture and configured to retain the removable receptacle in the railing system.

2. The apparatus of claim 1, wherein the frame is configured to receive a table top.

3. The apparatus of claim 2, wherein the table top comprises a plurality of inlays coupled to the frame.

4. The apparatus of claim 1, wherein the removable receptacle is a metal pan.

5. The apparatus of claim 4, wherein the frame is configured to receive a cooking element dimensioned and configured to be disposed above the removable receptacle.

6. The apparatus of claim 1, wherein the sleeve disposed within the aperture includes a portion larger than the aperture that interferes with a top surface of the frame.

7. The apparatus of claim 1, wherein the removable receptacle is configured to be suspended by the railing system.

8. The apparatus of claim 1, wherein the railing system is configured to receive the removable receptacle when the frame is coupled to the support structure.

9. The apparatus of claim 1, wherein the removable receptacle is removable from the railing system while the frame remains coupled to and supported by the support structure.

10. The apparatus of claim 1, wherein the frame is coupled directly to the support structure.

11. The apparatus of claim 1, wherein the railing system is configured to receive the removable receptacle in a lateral direction.

12. The apparatus of claim 1, wherein the sleeve is removable from the aperture to allow the removable receptacle to be removed from the railing system.

13. The apparatus of claim 1, further comprising a table top coupled to the frame, and wherein:
    the sleeve is configured to be disposed within the aperture such that a first portion of the sleeve is disposed within the removable receptacle when the removable receptacle is coupled to the railing system, and a second portion of the sleeve extends circumferentially about a top portion of the table top.

14. The apparatus of claim 1, wherein with the removable receptacle coupled to the railing system and the sleeve disposed within the aperture, the sleeve is configured to limit lateral movement of the removable receptacle along the railing system.

15. An apparatus, comprising:
    a support structure;
    a frame coupled to the support structure, the frame including an aperture disposed therein;
    a railing system coupled to the frame and configured to receive a removable receptacle after the frame has been coupled to the support structure, the removable receptacle configured to contain a fuel for a fire; and
    a removable sleeve disposed within the aperture and configured to retain the removable receptacle in the railing system.

16. The apparatus of claim 15, wherein the frame is configured to receive a table top including a plurality of inlays coupled to the frame.

17. The apparatus of claim 16, wherein the railing system is suspended from and below the frame and is configured to slidably receive the removable receptacle such that the railing system suspends the removable receptacle above a surface on which the support structure is placed.

18. The apparatus of claim 15, wherein the removable sleeve disposed within the aperture includes a portion larger than the aperture that interferes with a top surface of the frame.

19. The apparatus of claim 15, wherein the removable receptacle is removable from the railing system while the frame remains coupled to and supported by the support structure.

20. The apparatus of claim 15, wherein the frame is coupled directly to the support structure.

21. The apparatus of claim 15, wherein the railing system is configured to receive the removable receptacle in a lateral direction.

22. An apparatus, comprising:
    a support structure including a plurality of legs;
    a frame coupled to the support structure, the frame including a table top and an aperture disposed therein; and
    a railing system suspended from the frame and configured to slidably receive a removable receptacle, the removable receptacle configured to align within the aperture and contain a fuel for a fire, the removable receptacle being removable from the railing system while the frame remains coupled to and supported by the support structure.

23. The apparatus of claim 22, wherein the removable receptacle is configured to be suspended by the railing system.

24. The apparatus of claim 20, further comprising a sleeve disposable within the aperture to prevent lateral movement of the removable receptacle relative to the railing system.

* * * * *